United States Patent Office 3,194,815
Patented July 13, 1965

---

3,194,815
ESTERS OF HYDROXYMETHYL-DIMETHYL-META-DIOXANE
Vincent J. Keenan, Ardmore, and Edward S. Wheeler, Ambler, Pa., assignors to The Atlantic Refining Company, Philadelphia, Pa., a corporation of Pennsylvania
No Drawing. Filed July 17, 1962, Ser. No. 210,587
1 Claim. (Cl. 260—340.7)

This invention relates to esters of hydroxymethyl-dimethyl-meta-dioxanes and, more particularly, to the mono- and dicarboxylic fatty acid and the mono- and dicarboxylic aromatic acid esters of hydroxymethyl-dimethyl-meta-dioxanes which esters are particularly useful as plasticizers for synthetic resins.

The reaction of an olefin with formaldehyde or similar aldehyde in the presence of an acid catalyst to produce alkylated meta-dioxanes is the well-known Prins reaction. In the crude product resulting from the reaction of either isobutylene or butene-2, or both, with formaldehyde along with the 4,4-dimethyl-meta-dioxane and 4,5-dimethyl-meta-dioxane are found various by-products and some unreacted materials. Among the by-products found in the dimethyl-meta-dioxane distillation residue are small amounts of hydroxymethyl - dimethyl - meta - dioxanes. Thus in the production of 4,4-dimethyl-meta-dioxane from the reaction of isobutylene with formaldehyde at temperatures ranging from 40° C. to 70° C. in the presence of aqueous sulfuric acid catalyst of about 10 to 40 weight percent concentration, preferably about 25 weight percent concentration, there is also found a small amount of 4,4-dimethyl-5-hydroxymethyl - meta - dioxane. Similarly, in the reaction of butene-2 with formaldehyde (acid concentrations of 40 to 60 weight percent preferred), there is also found some 4,5-dimethyl-4-hydroxymethyl-meta-dioxane or some 4,5-dimethyl-5-hydroxymethyl-meta-dioxane or both. The yield of these hydroxymethyl-dimethyl-meta-dioxanes may be substantially increased by hydrolyzing in the presence of an acidic catalyst that portion of the distillation residue boiling above 150° C. at 10 mm. mercury pressure obtained from the above-described olefin-aldehyde reactions. The details of this method of production of hydroxymethyl-dimethyl-meta-dioxanes are set forth in U.S. Patent No. 3,000,905.

It now has been found that the hydroxymethyl-dimethyl-meta-dioxanes may be esterified to produce esters that are useful as plasticizers for synthetic resins.

It is an object of this invention to provide esters of the hydroxymethyl-dimethyl-meta-dioxanes useful as plasticizers for synthetic resins.

It is another object of this invention to provide mono- and dicarboxylic fatty acid esters of hydroxymethyl-dimethyl-meta-dioxanes.

It is another object of this invention to provide mono- and dicarboxylic aromatic acid esters of hydroxymethyl-dimethyl-meta-dioxanes.

Additional objects will be apparent from the following description and from the claims.

The usual methods of preparing esters of alcohols are to react the alcohol with the acid in the presence of a strongly acidic catalyst such as sulfuric acid or para-toluene sulfonic acid, or to react the acid chloride with the alcohol. These methods, however, are not suitable for preparing the esters of the hydroxymethyl-dimethyl-meta-dioxanes since the heterocyclic meta-dioxane ring is acid sensitive and breaks in the presence of strong acids such as sulfuric acid or para-toluene sulfonic acid or the acid chloride.

Accordingly, the esters of the instant invention are prepared by forming a complex salt between the acid chloride and pyridine and thereafter reacting the alcohol (the hydroxymethyl-dimethyl-meta-dioxane) with the complex salt to produce the desired ester.

In accordance with this invention, the 4-hydroxymethyl-dimethyl-meta-dioxane isomers and the 5-hydroxymethyl-dimethyl-meta-dioxane isomers either in the form of the individual compounds or in various admixtures are utilized. These compounds have the respective formulas:

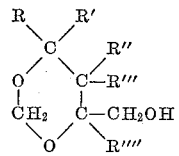 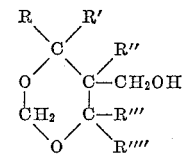

whrerein two of the groups R, R', R", R''' and R'''' are methyl and the others hydrogen.

The mono-carboxylic fatty acid esters include those having from 2 to 14 carbon atoms in the molecule, i.e., from the acetate to the myristate.

The dicarboxylic fatty acid esters range from the $C_3$ to $C_{15}$ compounds. The mono- and dicarboxylic aromatic acid esters include the benzoates and the isomeric phthalates, i.e., the esters of phthalic acid, isophthalic acid and terephthalic acid. Thus the esters of this invention have the formula:

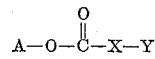

wherein A is selected from

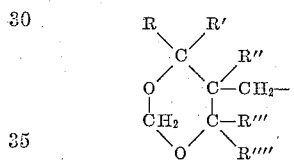 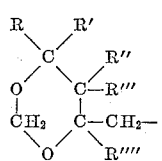

wherein two of the groups R, R', R", R''' and R'''' are methyl and the others hydrogen,
X is a radical selected from

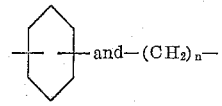

wherein $n$ is an integer from 1 to 13 and Y is selected from hydrogen and

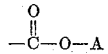

These esters are prepared by dissolving the acid chloride in benzene and adding thereto dry pyridine in the amount corresponding to a slight molar excess, i.e., 1.1 to 1.4 moles of pyridine per mole of dichloride. The hydroxymethyl-dimethyl-meta-dioxane is added to the solution of acid chloride and pyridine at a rate such that there is a slight and occasional refluxing obtained. The reaction is continued with agitation and, if necessary, slight heating to obtain reflux conditions, for from 40 to 50 minutes. Then water is added to decompose the excess complex salt. The aqueous layer is separated from the organic layer. The organic layer is washed with water, distilled to remove the benzene and finally distilled under reduced pressure to remove any unreacted hydroxymethyl-dimethyl-meta-dioxanes. The residue is the desired ester.

The following examples are provided to illustrate the method of preparation of the esters and the properties of typical esters of this invention.

EXAMPLE I

In a flask fitted with a dropping funnel, magnetic stirrer and reflux condenser is placed 300 ml. of a 2-molar solution of phthaloyl dichloride in benzene (equivalent to 0.6 mole of dichloride). To this solution is added through the dropping funnel 115 ml. (1.4 moles) of dry pyridine. Finally, there is added through the dropping funnel 190 grams (1.3 moles) of hydroxy-methyl-dimethyl-meta-dioxanes at a rate so as to get occasional refluxing. The hydroxymethyl-dimethyl-meta-dioxanes used for this preparation had been produced by hydrolyzing the distillation residue boiling above 150° C. at 10 mm. mercury pressure obtained from the reaction of isobutylene and butene-2 with formaldehyde as described in the aforementioned patent No. 3,000,905. Thus all of the possible isomers described hereinbefore were contained in the mixture.

The reaction mixture in the flask was stirred for 40 to 50 minutes with slight heating to reflux, and thereafter 50 ml. of water was added to decompose the complex salt of the pyridine and phthaloyl dichloride. The aqueous layer was separated by decantation and discarded, and the organic layer was washed with water. The organic layer was distilled to remove the benzene and then distilled under reduced pressure (4 mm. of mercury) to remove the unreacted hydroxymethyl-dimethyl-meta-dioxanes. The residue which remained after removing all compounds with a boiling point below 110° C. at 4 mm. mercury pressure weighed 240 grams. The ester was identified as the phthalate ester of the hydroxymethyl-dimethyl-meta-dioxanes by carbon and hydrogen analysis, saponification number and molecular weight.

EXAMPLE II

Preparations similar to that described in Example I were made for the acetate ester, the adipate ester, and the myristate ester; each of these was also identified by carbon and hydrogen analysis, saponification number and molecular weight.

EXAMPLE III

The phthalate, myristate and adipate prepared in Examples I and II were tested for their ability to plasticize commercial synthetic resins. The compositions prepared and tested consisted of 60 weight percent resin, 30 weight percent plasticizer, and 10 weight percent commercial alumina filler (200 mesh). The ingredients were combined on an unheated rubber mill and the resulting sheet stock was cured for 1 hour at 300° F. The synthetic resins employed were plastisol-grade polyvinyl chloride and commercial polyvinyl chloride-polyvinyl acetate copolymer. The plasticizing properties were compared to the same compositions employing dioctyl phthalate as the plasticizer. The phthalate ester was blended with an equal weight of dioctyl phthalate and combined with the resins as described. Blends of the myristate ester with an equal weight of dioctyl phthalate were also combined with the resins. The test results are shown in the table.

Table

| Composition | Tensile Strength,[1] p.s.i. | Percent Elongation at Break[1] | Percent weight loss in— | | | Shore Hardness |
| --- | --- | --- | --- | --- | --- | --- |
| | | | Air, 24 hrs. @ 100° C. | Gasoline 24 hrs. @ Room Temp. | Detergent,[2] 6 hrs. @ 60° C. | |
| Dioctyl phthalate—PVC | 1,281 | 92 | 1.4 | 17.4 | +1.6 | 93 |
| Dioctyl phthalate—PVC/PVA | 2,349 | 192 | 0.38 | 1.7 | +0.6 | 88 |
| HMDMDO phthalate (Ex. I)—PVC | 4,590 | 46 | 0.36 | +2.3 | +0.61 | 98 |
| HMDMDO phthalate (Ex. I)—PVC/PVA | 3,380 | 6 | 0.32 | +1.8 | +0.51 | 97 |
| HMDMDO myristate (Ex. II)—PVC | 1,503 | 118 | 0.53 | 14.9 | 2.6 | 91 |
| HMDMDO myristate (Ex. II)—PVC/PVA | 1,268 | 158 | 0.65 | 7.2 | 2.2 | 85 |
| HMDMDO adipate (Ex. II)—PVC | 1,750 | 228 | 0.20 | | .04 | 70 |
| HMDMDO phthalate, dioctyl phthalate—PVC | 2,900 | 174 | 0.46 | 5.6 | 0.14 | 92 |
| HMDMDO phthalate, dioctyl phthalate—PVC/PVA | 2,639 | 177 | 0.50 | +11.1 | +.09 | 91 |
| HMDMDO myristate, diocytl phthalate—PVC | 2,685 | 225 | 0.52 | 14.5 | 0.32 | 91 |
| HMDMDO myristate, dioctyl phthalate—PVC/PVA | 2,028 | 202 | 0.82 | 10.4 | 1.4 | 89 |

PVC—Polyvinyl chloride plastisol grade.
PVC/PVA—Polyvinyl chloride-polyvinyl acetate copolymer.
HMDMDO—Hydroxymethyl-dimethyl-meta-dioxane.
[1] Tensile Strength and Elongation by ASTM Method D638-52T.
[2] Commercial anionic sodium sulfonate-sulfate type.

Since dioctyl phthalate is one of the most widely used plasticizers for synthetic resins, these results show that the esters of this invention are useful as plasticizers for synthetic resins. It is also apparent that there are differences among the esters with respect to their effect on certain properties of the resins, but in general they are equal to or superior to commonly used plasticizers. Similarly, the acetate, benzoate and other esters falling within the scope of this invention may be used as plasticizers for synthetic resins and these also exhibit effects on the properties of resins equal to or superior to commercially used plasticizers.

We claim:

A phthalate ester of hydroxymethyl-dimethyl-meta-dioxane, said ester having the formula

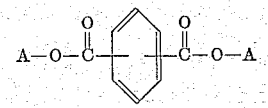

wherein A is a member of the group consisting of

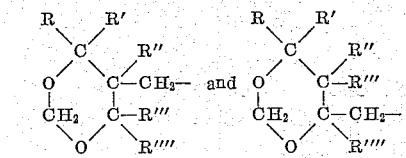

and wherein two of the groups R, R', R", R'", R"" are methyl and the others hydrogen.

References Cited by the Examiner

UNITED STATES PATENTS 2,441,555  5/48  Barth et al. _____ 260—340.7
2,996,517  8/61  Leech et al. _____ 260—340.7
3,000,905  9/61  Wheeler et al. _____ 260—340.7

FOREIGN PATENTS 587,750  5/47  Great Britain.

OTHER REFERENCES

Farberov et al., Chem. Abstracts., vol. 52, col. 8145 (1958).
Imoto et al., Chem. Abstracts, vol. 47, col. 3822 (1953).
Smith et al., Ind. Eng. Chem., vol. 42, pp. 2576-9 (1950).
Thinius, Chem. Abstracts, vol. 49, col. 9959 (1955).

WALTER A. MODANCE, *Primary Examiner*.

NICHOLAS S. RIZZO, *Examiner*.